(12) United States Patent
Buenning et al.

(10) Patent No.: US 6,666,325 B1
(45) Date of Patent: Dec. 23, 2003

(54) CONVEYOR LINE AND SUPPORT PROFILE FOR A CONVEYOR LINE

(75) Inventors: Torsten Buenning, Stuttgart (DE); Harald Kuepferle, Pleidelsheim (DE); Olaf Klemd, Markgroeningen (DE); Armin Breitenbuecher, Pluederhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/069,700

(22) PCT Filed: Aug. 11, 2000

(86) PCT No.: PCT/DE00/02700

§ 371 (c)(1),
(2), (4) Date: Jun. 24, 2002

(87) PCT Pub. No.: WO01/16001

PCT Pub. Date: Mar. 8, 2001

(30) Foreign Application Priority Data

Aug. 27, 1999 (DE) .......................................... 199 40 672

(51) Int. Cl.⁷ .............................................. B65G 13/12
(52) U.S. Cl. ................ 198/782; 198/860.3; 198/860.1; 193/35 R
(58) Field of Search .............................. 198/782, 860.1, 198/860.3, 780; 193/35 R

(56) References Cited

U.S. PATENT DOCUMENTS

| 1,138,822 A | 5/1915 | Williams |
| 2,696,283 A | 12/1954 | Barry |
| 2,801,730 A | * 8/1957 | Strickler ...................... 198/780 |
| 5,372,247 A | 12/1994 | Nishikawa |
| 5,657,854 A | 8/1997 | Chen et al. |
| 6,089,385 A | * 7/2000 | Nozawa ...................... 193/35 R |
| 6,286,660 B1 | * 9/2001 | Kalm .......................... 198/782 |

FOREIGN PATENT DOCUMENTS

| DE | 35 18 134 A1 | 11/1986 |
| DE | 93 16 922 U | 1/1994 |
| DE | 195 32 390 A | 3/1997 |
| DE | 195 32 390 A1 | 3/1997 |
| EP | 0 385 849 A | 9/1990 |
| FR | 2 428 589 | 1/1980 |
| WO | 99 02435 A | 1/1999 |

* cited by examiner

Primary Examiner—Gene O. Crawford
(74) Attorney, Agent, or Firm—Michael J. Striker

(57) ABSTRACT

A conveyor track (10) and a load-bearing profile (14) for a conveyor track (10) are proposed. The conveyor track (10) has two load-bearing profiles (14) extending substantially parallel. Each load-bearing profile (14) has one longitudinal side (26), to which a guide profile (16) can be fastened. The invention is characterized in that a rod (18) for supporting rollers (20) is fixable on the load-bearing profile (14) by the guide profile (16). As a result, the rollers (20) can be installed especially simply. If no rollers (20) are used, then workpieces or workpiece holders (12) can be slid along slide faces (66) of the guide profile (16).

21 Claims, 2 Drawing Sheets

Figure 1:
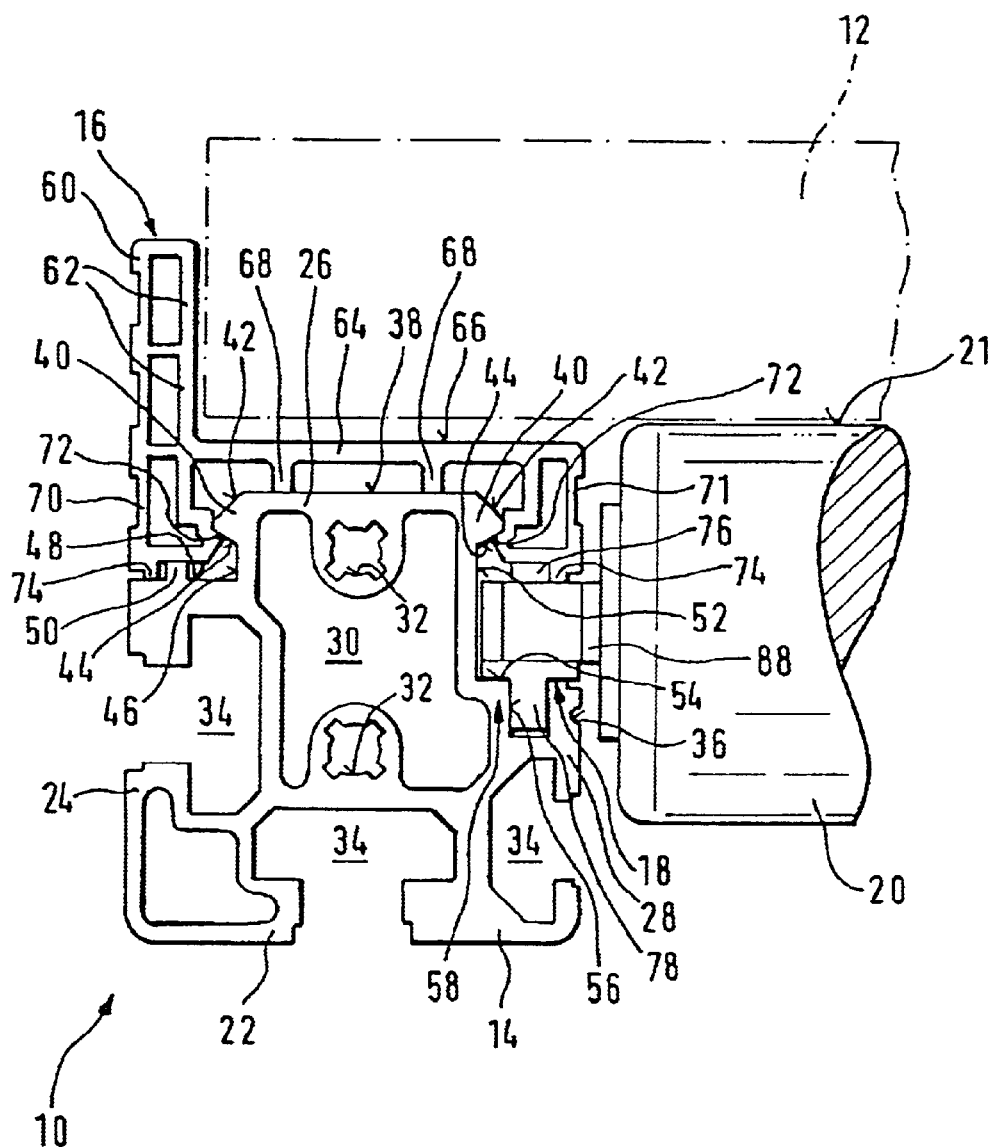

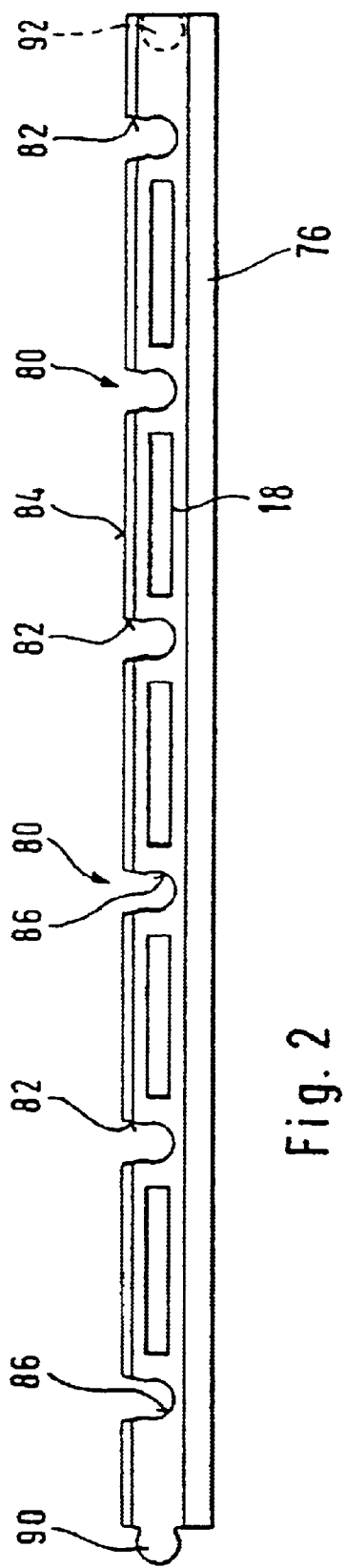
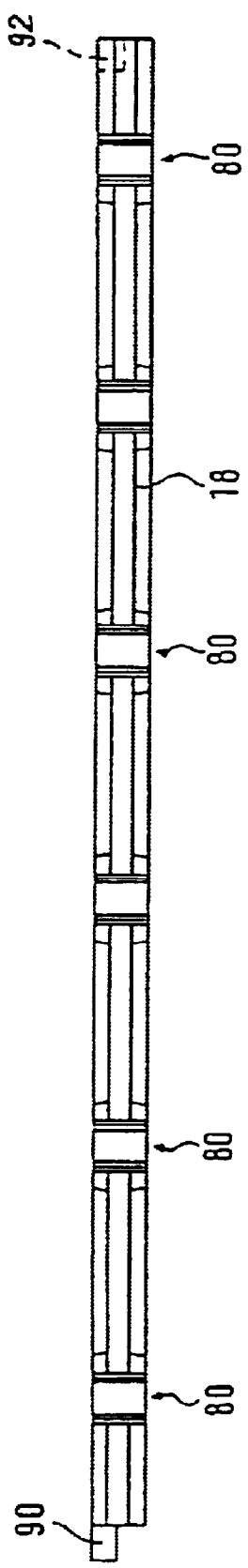

CONVEYOR LINE AND SUPPORT PROFILE FOR A CONVEYOR LINE

PRIOR ART

The invention is based on a conveyor track and a load-bearing profile for a conveyor track as generically defined by the preambles to the independent claims. One such conveyor track and one such load-bearing profile for a conveyor track are known for instance from German Patent Disclosure DE 35 18 134 A1. This conveyor track has two substantially parallel load-bearing profiles. Each load-bearing profile has one longitudinal side to which a guide profile can be fastened. The conveyor track and the load-bearing profile with the guide profile are limited to use in double-belt conveyors.

The catalog entitled "Manuelle Arbeitssysteme" [Manual Work Systems], edition 7.0 (1998) of Robert Bosch, GmbH, Stuttgart, Germany, pages 8–12 through 8–15, describes fastening rollers to load-bearing profiles by means of screwed-on roller holders. For each roller, one roller holder has to be provided. The installation effort and expense is quite high because each roller holder must be mounted individually with a hammer nut or sliding block and a screw. Installation is also made more difficult by the fact that two roller holders supporting one roller have to be aligned quite precisely with one another, because otherwise the roller may move roughly or even become jammed.

ADVANTAGES OF THE INVENTION

The conveyor track of the invention and the load-bearing profile for a conveyor track of the invention, as defined by the characteristics of the bodies of the independent claims, have the advantage over the prior art that they can easily be used for so-called roller sections, since the assembly for such a roller section can be done without tools. They can also be used as slide sections for manual displacement sections, as well for double-belt conveyors.

It is especially favorable to dispose a rod for supporting the rollers in a receptacle on the load-bearing profile and to fix it by means of a guide profile that can fastened in detent-lockable fashion to the load-bearing profile.

If a slide face for workpiece holders or workpieces to be conveyed thereon is embodied on the guide profile, then the conveyor track can be readily used as a manual displacement section.

It is expedient if a plurality of bearing points for roller elements are provided longitudinally of the rod. To that end, at uniform spacings, recesses can be embodied in which the rollers can be supported. As a result, in a simple way, the rollers are spaced equally apart from one another.

If a rounded extension is provided on one end of the rod and a rag on the other end of the rod, such that the extension of a first rod can be disposed in the depression of a second rod, then a plurality of rods can be disposed one after another by positive engagement, secured in the longitudinal direction.

Further advantages and advantageous refinements of the conveyor track and the load-bearing profile for a conveyor track according to the invention will become apparent from the dependent claims and the description.

DRAWING

One exemplary embodiment of the invention is shown in the drawing and explained in further detail in the ensuing description. Shown are FIG. 1, a front view of a conveyor track;

FIG. 2, an elevation view of a rod for supporting rollers; and

FIG. 3, a plan view of the rod of FIG. 2.

DESCRIPTION OF THE EXEMPLARY EMBODIMENT

FIG. 1 shows a fragmentary view of a conveyor track 10 from the front. The conveyor track 10 serves to convey workpiece holders, identified by reference numeral 12, or workpieces. The conveyor track 10 has two load-bearing profiles 14, disposed essentially parallel to one another, and on each load-bearing profile 14 there are one guide profile 16 and preferably one or more rods 18 for supporting rollers 20. The rollers 20 here are disposed in succession in the longitudinal direction of the conveyor track 10. The lines representing the outer circumferences of the rollers 20, on which the workpiece holders 12 or workpieces rest, form the conveying plane 21 of the conveyor track 10.

The load-bearing profile 14 is produced by aluminum extrusion; it has essentially four longitudinal sides 22, 24, 26, 28, and one void 30 extending longitudinally. In the void, two screw conduits 32 are formed. By means of the screw conduits 32, the face ends of the load-bearing profile 14 can be closed by plates, not shown. As a result, the void 30 can be used as a compressed air line. The longitudinal side 22 represents the underside of the load-bearing profile 14, if the conveyor track 10 is set up horizontally. In that case, the longitudinal side 24 represents the outside of the load-bearing profile 14. Also in this case, the longitudinal side 24 extends laterally on the outside of the conveyor track 10. A mounting groove 34 with an undercut is embodied in both the longitudinal side 22 and the longitudinal side 24. As a result, further components can be mounted on the conveyor track 14 in a simple way.

The guide profile 16 can be fastened to the longitudinal side 26, which when the conveyor track 10 is set up horizontally is the top side of the load-bearing profile 14. Finally, one or more rods 18 for supporting the rollers 20 can be disposed along the longitudinal side 28, which adjoins the longitudinal side 26 and thus, when the conveyor track 10 is set up horizontally, extends along the inside of the conveyor track 10. Along the region of the longitudinal side 28 extending between the rod 18 and the longitudinal side 22, an indentation 36 acting as an aid in beginning to drill a hole, and a further mounting groove 34 are provided.

The guide profile 16, which can for instance be embodied as an extruded plastic part, can be fastened in detent-lockable fashion to the load-bearing profile 14. To that end, a bearing face 38 for the guide profile 16 is embodied on the longitudinal side 26 of the load-bearing profile 14 that is intended for the guide profile 16. And that detent portions 40 for the guide profile 16 adjoin the bearing face 38. The detent portions 40 have first face portions 42, oriented away from the bearing face 38 and extending downward, which are adjoined by face portions 44 oriented toward the middle of the load-bearing profile 14. As a result, the face portions 42, 44 form two oblique faces pointing away from one another to form a detent portion 40.

The face portion 44 oriented toward the longitudinal side 24 is adjoined by a face portion 46 extending perpendicular to the conveying plane 21. The perpendicularly extending face portion 46 is adjoined by a horizontally extending face portion 48, which merges with the longitudinal side 24. A rib 50 is also provided on the face portion 48.

In the conveying plane 40 oriented toward the longitudinal side 28, the face portion 44 is adjoined by a face portion 52, which extends substantially perpendicular to the conveying plane 21. The face portion 52 is adjoined by a portion 54 that preferably extends substantially parallel to the conveying plane 21 of the conveyor track 10. A groove 56 extends in the portion 54. The region of the face portion 52 and the portion 54 represents a receptacle 58 for the rod 18.

The guide profile 16 has an essentially L-shaped cross-sectional area. A first leg 60 of the guide profile 16 extends perpendicular to the conveying plane 21 and forms a lateral guide for workpieces or workpiece holders 12. The first leg 60 of the L is approximately flush, on the outside of the conveyor track 10, with the longitudinal side 24. For the sake of saving weight, hollow chambers 62 are embodied in the first leg 60 of the L.

The outside, facing away from the bearing face 38, of the second leg 64 of the L—which leg extends horizontally in FIG. 1—of the guide profile 16 is embodied as a slide face 66 for workpieces or workpiece holders 12 to be conveyed thereon. The slide face 66 is preferably located somewhat below the conveying plane 21 formed by the rollers 20, so that workpieces or workpiece holders 12 are not exposed to any additional friction when rollers 20 are used. The second leg 64 of the L has two ribs 68 extending parallel to one another, and with these ribs it rests on the bearing face 38. The guide profile 16, on the ends of the side remote from the slide face 68, of the second, horizontal leg 64 of the L has two portions 70, 71, with hooklike extensions 72 facing toward one another. The hooklike extensions 72 of the portions 70, 71 grip the detent portions 40, and the hooklike extensions 72 rest on the face portions 44 of the load-bearing profile 14. The portion 70, which is located in the region of the longitudinal side 24 and is aligned with the first, perpendicularly extending leg 62 of the L, rests on one side on the rib 50 and on the other, with the extension 74, on the region of the face portion 48 that extends between the rib 50 and the longitudinal side 24. This assures quite a stable fastening of the guide profile 16 to the load-bearing profile 14.

With an extension 74, the portion 71 grips the rod 18. To that end, the rod preferably has an extension 76, which extends essentially perpendicular to the conveying plane 21 of the conveyor track 10. The rod 18, which is disposed in the receptacle 58, has an additional extension 78, diametrically opposite the extension 76 that is gripped by the guide profile 16, and disposed in the groove 56 of the portion 54. In the put-together state of the conveyor track 10, the guide profile 16 with its portion 71 and the extension 74 thereof, together with the receptacle 58 of the load-bearing profile 14 form an undercut groove, in which the rod 18 can be securely fastened.

The rod 18 can be produced in the form of an injection-molded plastic part, for instance. As FIGS. 2 and 3 show, a plurality of bearing points 80 for rollers 20 are provided in the longitudinal direction of the rod 18. For that purpose, recesses 82 are preferably formed in the rod 18, at uniform spacings, originating on one side 84 of the rod 18, which in the mounted state faces toward the conveying plane 21. The recesses 82 extend in wedgelike fashion and end in circular-segmental depressions 86, which preferably form an angle of more than 180°. The depressions 86 have a diameter that is equivalent to that of the pegs 88 on the face ends of the rollers 20 (FIG. 1). At the transition to the circular-segmental depressions 86, the recesses 82 have a spacing that is less than the diameter of the pegs 88. As a result, the rollers 20 with their pegs 88 are secured somewhat in the radial direction, once they have been inserted into the depressions 86. However, the bearing points 80 can also be constructed more simply. For instance, the recesses 82 and depressions 86 may be embodied as rectangular cutouts in the rod 18.

A rounded extension 90 is embodied on one end of the rod 18, and on the other end of the rod 18 there is a rag 92. The width of the extension 90 and the depression 92 extends over only half the width of the rod 18. As a result, the extension 90 of a first rod 18 can be disposed in the depression 92 of a second rod 18.

For assembling the conveyor track 10, first two load-bearing profiles 14 are cut to the required length and mounted on a stand, not shown. Next, rods 18 are put together by way of their extensions 90 and depressions 92 and placed in the receptacle 58. After that, the requisite number of rollers are placed in the bearing points 80 of the rods 18. Finally, one guide profile 16 is locked in detent fashion onto each load-bearing profile 14. In this operation, the portions 70 of the guide profile 16 are first widened by the face portions 42. Finally, the rods 68 of the leg 64 of the L rest on the bearing face 38, and the hooklike extensions 72 engage the detent portions 40 from behind and rest on the face portions 44. As a result, the rods 18 are also fixed by the guide profile 16 to the load-bearing profile 14. Thus conveyor tracks 10 can be constructed in a simple way to make so-called accumulating conveyors or roller sections.

By omitting the rollers 20 and optionally the rods 18, a conveyor track 10 can be constructed as a so-called manual displacement section. In that case, workpieces or workpiece holders 12 slide over the slide faces 68 of the guide profiles 16. On the other hand, belts of double-belt conveyors can also run over the slide faces 68. The conveyor track 10 is easy to use in a simple way for various kinds of uses.

Instead of the detent fastening of the guide profile 16 to the load-bearing profile 14 as described, in which the guide profile 16 grips outward-oriented detent portions 40, a detent fastening can also be embodied alternatively as described in the German reference cited above, DE 35 18 134 A1, in which detent portions of the load-bearing profile grip extensions of the guide profile. Besides a detent fastening, the guide profile can alternatively be glued on or screwed on, but a detent fastening is the simplest possibility for fastening and disassembly.

What is claimed is:

1. A conveyor track (10), having two substantially parallel load-bearing profiles (14), each load-bearing profile (14) having one longitudinal side (26) to which a guide profile (16) can be fastened, characterized in that along a longitudinal side (28) of the load-bearing profile (14), adjoining the longitudinal side (26) for the guide profile (16), a receptacle (58) provided for at least one rod (18) that has bearing points (82) for supporting rollers (20) is embodied, and that the receptacle (58) in the load-bearing profile (14), together with the guide profile (16) which has a portion (71) and an extension (74), form an undercut groove, in which the at least one rod (18) can be fastened, and the guide profile (16) is formed to guide laterally workpieces or workpiece holders and to guide movement of them in regions without rollers.

2. The conveyor track (10) of claim 1, characterized in that at least one rod (18) is provided with bearing points (82) for supporting rollers (20), and that the guide profile (16), with the extension (74), grips the at least one rod (18).

3. The conveyor track (10) of claim 1, characterized in that the extension (74) of the guide profile (16) grips an extension (76) provided on the at least one rod (18), which extends perpendicular to the conveying plane (21) of the conveyor track (10).

4. The conveyor track (10) of claim 1, characterized in that the guide profile (16) can be fastened in detent-lockable fashion to the load-bearing profile (14), and means is provided for the fastening of the guide profile (16) to the load-bearing profile 14.

5. The conveyor track (10) of claim 1, characterized in that the at least one rod (18) rests on a portion (54) of the receptacle (58) that extends parallel to the conveying plane (21) of the conveyor track (10).

6. The conveyor track (10) of claim 1, characterized in that the at least one rod (18) has an additional extension (78), which is diametrically opposite the extension (76) gripped by the guide profile (16), and that a groove (56) for receiving the additional extension (78) is embodied in the portion (54).

7. The conveyor track (10) of claim 1, characterized in that a plurality of bearing points (80) for rollers (20) are provided in the longitudinal direction of the at least one rod (18).

8. The conveyor track (10) of claim 1, characterized in that in the at least one rod (18), recesses (82) are embodied at uniform spacings, originating on one side (84) of the rod (18) and ending in circular-segmental depressions (86), serving as bearing points (80), that preferably form an angle of more than 180°.

9. A conveyor track as defined in claim 1, wherein said guide profile (16) is provided with slide faces (66) formed so that workpieces or workpiece holders are not exposed to any additional friction when rollers (20) are used.

10. A load-bearing profile (14) for a conveyor track (10), which profile has a longitudinal side (26) to which a guide profile (16) can be fastened, characterized in that along a longitudinal size (28) of the load-bearing profile (14), adjoining the longitudinal side (26) for the guide profile (16), a receptacle (58) for at least one rod (18) that has bearing points (82) for supporting rollers (20) is embodied, and that the receptable (58) in the load-bearing profile (14), together with the guide profile (16) which has a portion (71) and an extension (74) embodied on it, form an undercut groove, in which the at least one rod (18) can be fastened, and the guide profile (16) is formed to guide laterally workpieces or workpiece holders and to guide movement of them in regions without rollers.

11. The load-bearing profile (14) of claim 10, characterized in that the guide profile (16) can be fastened in detent-lockable fashion to the load-bearing profile (14).

12. A load-bearing profile (14) as defined in claim 10, wherein said guide profile (16) is provided with slide faces (66) formed so that workpieces or workpiece holders are not exposed to any additional friction when rollers (20) are used.

13. The load-bearing profile (14) of claim 10, characterized in that on the receptacle (58), a portion (54) for support for the at least one (18) is provided, and the portion (54) preferably extends substantially parallel to the conveying plane (21) of the conveyor track (10).

14. The load-bearing profile (14) of claim 13, characterized in that in the portion (54), a groove (56) is embodied for receiving an extension (78) of at least one rod (18).

15. A conveyor track (10), having two substantially parallel load-bearing profiles (14), each load-bearing profile (14) having one longitudinal side (26) to which a guide profile (16) can be fastened, characterized in that along a longitudinal side (28) of the load-bearing profile (14), adjoining the longitudinal side (26) for the guide profile (16), a receptacle (58) provided for at least one rod (18) that has bearing points (82) for supporting rollers (20) is embodied, and that the receptacle (58) in the load-bearing profile (14), together with the guide profile (16) which has a portion (71) and an extension (74), form an undercut groove, in which the at least one rod (18) can be fastened, that a bearing face (38) for the guide profile (16) is embodied on the longitudinal side (26) of the load-bearing profile (14) that is intended for the guide profile (16), and that detent portions (40) for the guide profile (16) adjoin the bearing face (38).

16. The conveyor track (10) of claim 15, characterized in that the detent portions (40) have first face portions (42), oriented away from the bearing face (38) and extending downward, which are adjoined by face portions (44) oriented toward the middle of the load-bearing profile (14), so that the face portions (42, 44) form two oblique faces pointing away from one another to form a detent portion (40), and that the guide profile (16) has two portions (70) with hooklike extensions (72), oriented toward one another, which grip the detent portions (40).

17. A conveyor track (10), having two substantially parallel load-bearing profiles (14), each load-bearing profile (14) having one longitudinal side (26) to which a guide profile (16) can be fastened, characterized in that along a longitudinal side (28) of the load-bearing profile (14), adjoining the longitudinal side (26) for the guide profile (16), a receptacle (58) provided for at least one rod (18) that has bearing points (82) for supporting rollers (20) is embodied, and that the receptacle (58) in the load-bearing profile (14), together with the guide profile (16) which has a portion (71) and an extension (74), form an undercut groove, in which the at least one rod (18) can be fastened, that a bearing face (38) for the guide profile (16) is embodied on the longitudinal side (26) of the load-bearing profile (14) that is intended for the guide profile (16), and that detent portions (40) for the guide profile (16) adjoin the bearing face (38).

18. The load-bearing profile (14) of claim 17, characterized in that the detent portions (40) have first face portions (42), oriented away from the bearing face (38) and extending downward, which are adjoined by face portions (44) oriented toward the middle of the load-bearing profile (14), so that the face portions (42, 44) form two oblique faces pointing away from one another to form a detent portion (40).

19. A conveyor track (10), having two substantially parallel load-bearing profiles (14), each load-bearing profile (14) having one longitudinal side (26) to which a guide profile (16) can be fastened, characterized in that along a longitudinal side (28) of the load-bearing profile (14), adjoining the longitudinal side (26) for the guide profile (16), a receptacle (58) provided for at least one rod (18) that has bearing points (82) for supporting rollers (20) is embodied, and that the receptacle (58) in the load-bearing profile (14), together with the guide profile (16) which has a portion (71) and an extension (74), form an undercut groove, in which the at least one rod (18) can be fastened, and that a slide face (66) for workpieces or workpiece holders (12) to be conveyed thereon is embodied on the guide profile (16) and is located below a conveying plane (21) formed by rollers (20).

20. A conveyor track (10), having two substantially parallel load-bearing profiles (14), each load-bearing profile (14) having one longitudinal side (26) to which a guide profile (16) can be fastened, characterized in that along a longitudinal side (28) of the load-bearing profile (14), adjoining the longitudinal side (26) for the guide profile (16), a receptacle (58) provided for at least one rod (18) that has bearing points (82) for supporting rollers (20) is embodied, and that the receptacle (58) in the load-bearing profile (14), together with the guide profile (16) which has a portion (71) and an extension (74), form an undercut groove, in which the at least one rod (18) can be fastened, that on one end of the at least one rod (18), a rounded extension (90) of a first rod (18) can be disposed in the depression (92) of a second rod (18).

21. A conveyor track (10), having two substantially parallel load-bearing profiles (14), each load-bearing profile (14) having one longitudinal side (26) to which a guide profile (16) can be fastened, characterized in that along a longitudinal side (28) of the load-bearing profile (14), adjoining the longitudinal side (26) for the guide profile (16), a receptacle (58) provided for at least one rod (18) that has bearing points (82) for supporting rollers (20) is embodied, and that the receptacle (58) in the load-bearing profile (14), together with the guide profile (16) which has a portion (71) and an extension (74), form an undercut groove, in which the at least one rod (18) can be fastened.

* * * * *